United States Patent
Ballard

(10) Patent No.: US 8,192,151 B2
(45) Date of Patent: Jun. 5, 2012

(54) TURBINE ENGINE HAVING COOLING GLAND

(75) Inventor: Henry G. Ballard, Easley, SC (US)

(73) Assignee: General Electric Company, Schenectady, NY (US)

( * ) Notice: Subject to any disclaimer, the term of this patent is extended or adjusted under 35 U.S.C. 154(b) by 540 days.

(21) Appl. No.: 12/432,126

(22) Filed: Apr. 29, 2009

(65) Prior Publication Data

US 2010/0278640 A1 Nov. 4, 2010

(51) Int. Cl.
*F01D 5/08* (2006.01)
*F01D 5/18* (2006.01)

(52) U.S. Cl. ....... 415/180; 415/115; 415/107; 416/93 R; 416/95

(58) Field of Classification Search .................. 415/107, 415/111, 115, 116, 175, 176, 177, 180; 416/93 R, 416/95
See application file for complete search history.

(56) References Cited

U.S. PATENT DOCUMENTS

| | | |
|---|---|---|
| 2,463,898 A | 3/1949 | Moore |
| 2,763,462 A | 9/1956 | McDowall et al. |
| 3,733,501 A | 5/1973 | Heller et al. |
| 3,743,443 A | 7/1973 | Jennings |
| 3,831,046 A | 8/1974 | Curtis et al. |
| 4,076,452 A | 2/1978 | Hartmann |
| 4,086,756 A | 5/1978 | Drake |
| 4,114,058 A | 9/1978 | Albaric |
| 4,114,059 A | 9/1978 | Albaric et al. |
| 4,217,755 A | 8/1980 | Williams |
| 4,451,200 A | 5/1984 | Libertini et al. |
| 4,486,024 A | 12/1984 | Cooper |
| 4,542,623 A | 9/1985 | Hovan et al. |
| 4,561,246 A | 12/1985 | Hovan |
| 4,793,141 A | 12/1988 | Yanai et al. |
| 5,120,192 A * | 6/1992 | Ohtomo et al. ............... 415/115 |
| 5,564,896 A | 10/1996 | Beeck et al. |
| 5,575,617 A * | 11/1996 | Marmilic et al. ............. 415/115 |
| 5,738,488 A * | 4/1998 | Gazzillo et al. ............... 415/112 |
| 6,155,040 A | 12/2000 | Sasaki |
| 6,244,816 B1 | 6/2001 | Magoshi |
| 6,267,553 B1 | 7/2001 | Burge |
| 6,293,089 B1 | 9/2001 | Sasaki |
| 6,695,575 B1 | 2/2004 | Sasse et al. |
| 6,895,753 B2 | 5/2005 | Larsson et al. |
| 7,055,305 B2 | 6/2006 | Baxter et al. |

FOREIGN PATENT DOCUMENTS

| | | |
|---|---|---|
| DE | 1069428 | 11/1959 |
| DE | 2008209 | 9/1970 |
| DE | 2043480 A | 4/1971 |
| DE | 2408839 | 8/1974 |
| DE | 3447740 | 7/1985 |
| EP | 1404952 | 1/2003 |
| FR | 1258330 | 2/1961 |
| SU | 1041712 | 9/1983 |

* cited by examiner

*Primary Examiner* — David Nhu
(74) *Attorney, Agent, or Firm* — Fletcher Yoder P.C.

(57) ABSTRACT

In one embodiment, a turbine may include a bearing housing for a rotor with a passage along an axis of rotation of the rotor shaft. A cooling gland configured to transfer cooling fluid to the passage may be mounted to the bearing housing with a mounting structure configured to mount the cooling gland substantially in-line with the passage of the rotor.

19 Claims, 7 Drawing Sheets

TURBINE ENGINE HAVING COOLING GLAND

BACKGROUND OF THE INVENTION

The subject matter disclosed herein relates to gas turbine engines, and more specifically, to mountings for cooling glands.

In general, gas turbine engines combust a mixture of compressed air and fuel to produce hot combustion gases. The combustion gases may flow through one or more stages of turbine blades to generate power for a load and/or a compressor. Due to the high temperatures within the turbine, cooling gases may be provided to the turbine rotors to help control the temperature.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a turbine engine includes a bearing housing having a passage along an axis of rotation of a shaft; a cooling gland configured to transfer cooling fluid to the passage; and a mounting structure configured to mount the cooling gland substantially in-line with the passage.

In another embodiment, a system includes a bearing housing for a rotor having a passage along an axis of rotation of a shaft; and a cooling gland configured to transfer cooling fluid to the passage, wherein the cooling gland is coupled to the bearing housing, and wherein the cooling gland is mechanically spaced apart from the bearing housing along the axis of rotation.

In another embodiment, a system includes a cooling gland configured to transfer cooling fluid to a passage of a rotor; and a mounting structure. The mounting structure includes an attachment portion configured to mount to a rotor bearing housing; a support portion configured to hold the cooling gland; and an offset portion coupled to the attachment portion and the support portion configured to space the cooling gland axially apart from the rotor bearing housing.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
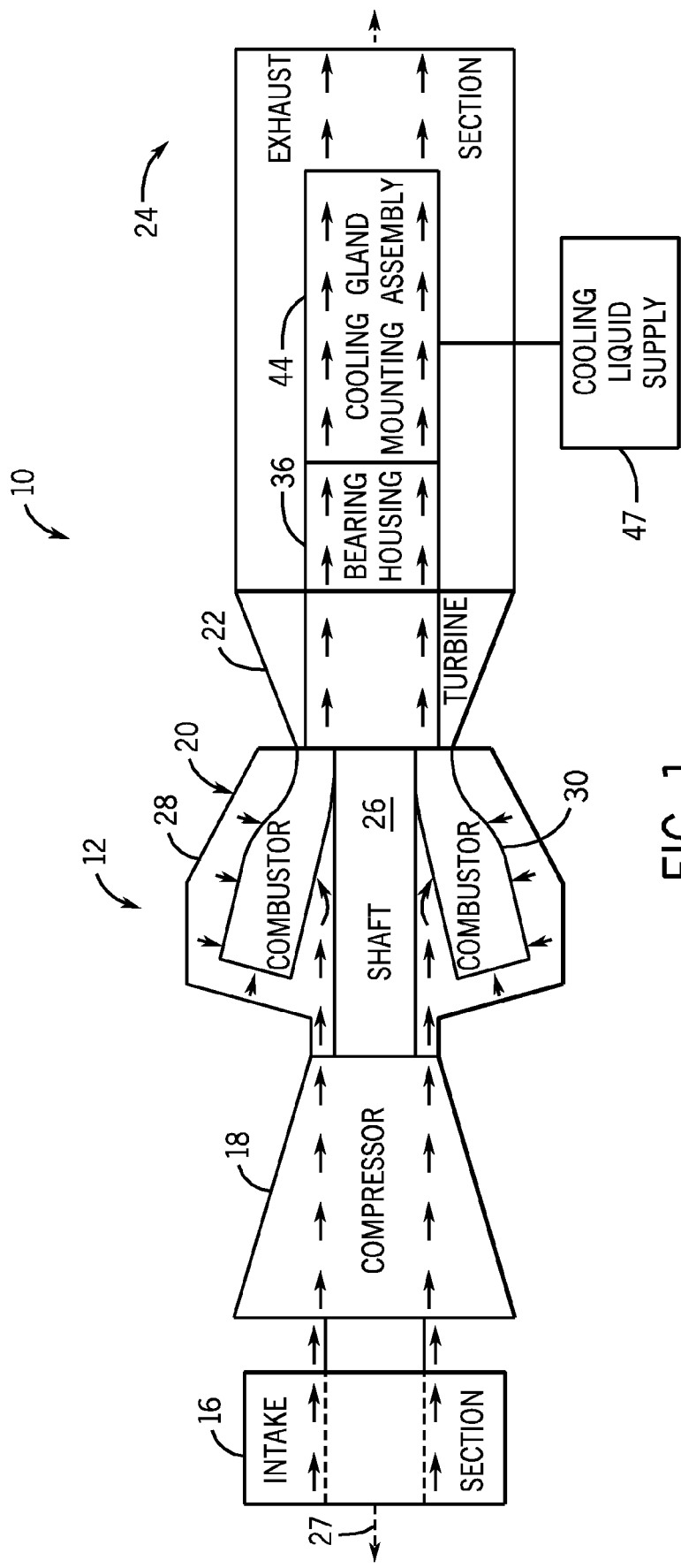
FIG. 1 is a schematic flow diagram of an embodiment of a gas turbine engine that may employ cooling glands.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gas turbine engines that include glands for providing cooling fluids between rotary and stationary turbine engine components. Steam cooling of hot gas path components of a rotary turbine involves the transfer of cooling steam, e.g., air or steam, from a fixed or stationary supply plenum to a rotating rotor for subsequent distribution to the hot gas path components of the rotor. An effective transfer of cooling fluids minimizes pressure losses of the cooling fluids as well as steam leakage into the gas turbine. Gland seals are utilized to provide an effective seal interface arrangement between a rotating and a stationary element and may be utilized to provide seals between a rotating shaft and a stationary steam turbine housing. A gland seal in a turbine engine may include connections for pipes or other inputs for cooling fluids to allow the transfer of pressurized cooling fluid into the exhaust while preventing leakage of steam from within the turbine engine to atmosphere.

Such glands may be fixed in place by applying a mounting cage or mounting structure directly to the aft end of the turbine rotor, e.g., within the exhaust frame. In certain embodiments, as discussed below, the mounting assembly (e.g., the gland and the mounting structure) may be applied to the bearing housing so that the gland is concentrically aligned with the axis of the rotor shaft. This arrangement reduces the complexity, labor, and material costs associated with prior cooling gland mounting structures in which each cooling supply pipe is typically aligned and mounted separately to the exhaust housing, not the bearing housing. In addition, when the gland mounting assembly is directly mounted to the bearing housing, the gland-to-rotor alignment is structurally related to the bearing housing alignment to the rotor. Therefore, if the bearing housing is substantially aligned to the rotor, the gland will also be substantially aligned. Such an arrangement may eliminate a separate alignment step for the gland. In addition, such an alignment may result in improved engine performance as the relative movement of the gland to the rotor, which may lead to leakage, is dependent only on relative movement of the bearing housing to the rotor. In other words, the direct connection or integration of the cooling gland and bearing reduces the mounting and alignment process to a single step, rather than the multiple steps associated with separately mounting and aligning the cooling gland. Thus, the disclosed embodiments with a unified cooling gland and bearing simplify the initial alignment and subsequent maintenance of the alignment.

In certain embodiments, the gland is thermally isolated from bearing housing via the mounting structure. While the mounting structure may directly contact the bearing housing, the gland itself may not be in direct contact with the bearing housing. Such an arrangement thermally isolates the rotor cooling air that is generally at a higher temperature relative to the oil in the bearing, preventing coking of oil in the bearing housing.

FIG. 1 is a block diagram of an exemplary system 10 including a gas turbine engine 12 that may employ cooling glands as provided herein. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is drivingly coupled to the compressor 18 via a shaft 26, which rotates along rotational axis 27.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30 where the compressed air may mix and combust with fuel within the combustors 30 to drive the turbine 22.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24. Cooling fluid from cooling fluid supply 47 may be transferred to the hot components of the turbine engine 22 via a cooling gland mounting assembly 44 mounted to a bearing housing 36, the assembly 44 and the bearing housing 36 being part of the exhaust section 24. In embodiments, the cooling fluid supply may be an external supply of, for example, ambient air. In other embodiments, the cooling fluid may be extracted from cooler parts of the turbine engine.

Figure 2:
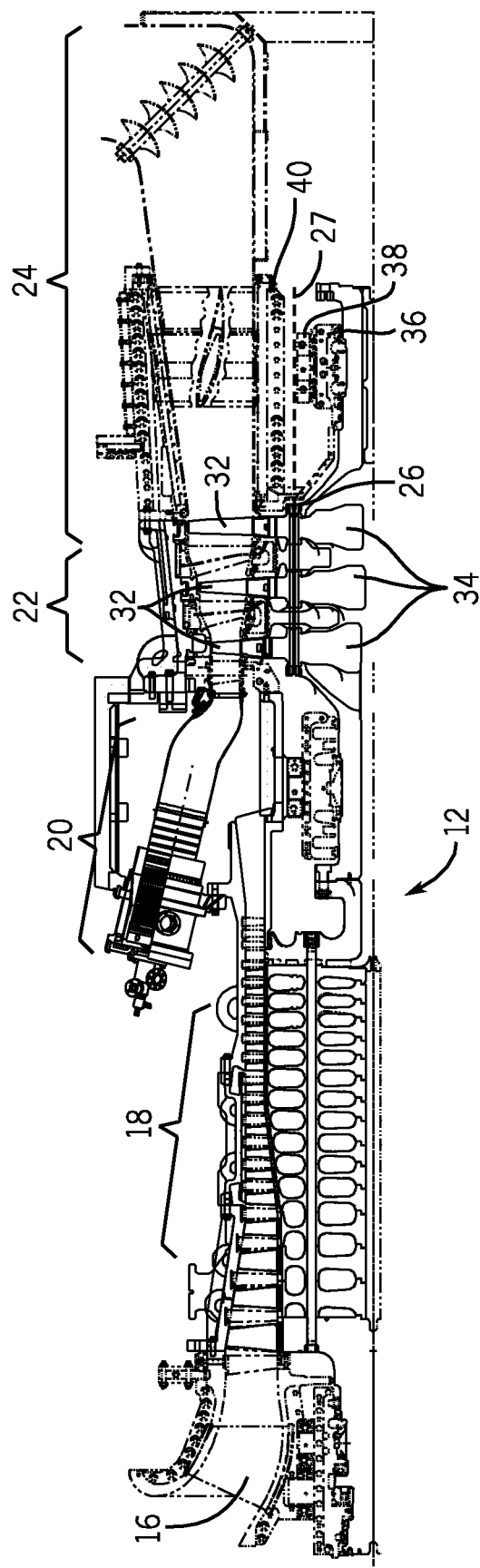
FIG. 2 is a cross-sectional view of an embodiment of the gas turbine engine of FIG. 1 sectioned through the longitudinal axis.

As described above with respect to FIG. 1, air may enter through the air intake section 16 and be compressed by the compressor 18, as shown in FIG. 2. The compressed air from the compressor 18 may then be directed into the combustor section 20 where the compressed air may be mixed with fuel gas. The mixture of compressed air and fuel gas is generally burned within the combustor section 20 to generate high-temperature, high-pressure combustion gases, which may be used to generate torque within the turbine 22. Accordingly, the turbine section 22 of the engine includes moving parts and hot gases. The hot gases may be vented out the exhaust section 24. The moving parts, including the shaft 26, may be configured to be supported by and rotate within a bearing housing 36, which may be coupled by supports 38 to the exhaust section 24 within an exhaust frame inner barrel 40. Generally, the shaft 22 may be supported by the bearing housing at either end of the shaft 22. The bearing housing 36 may have a curved structure upon which the shaft may rotate. The bearing housing 36 may include lubrication to facilitate efficient rotation of the shaft. As discussed in detail below, a cooling gland mounting structure that is mounted directly to the bearing housing may allow a cooling gland to provide cooling fluid the shaft 22 and bearing housing.

Figure 3:
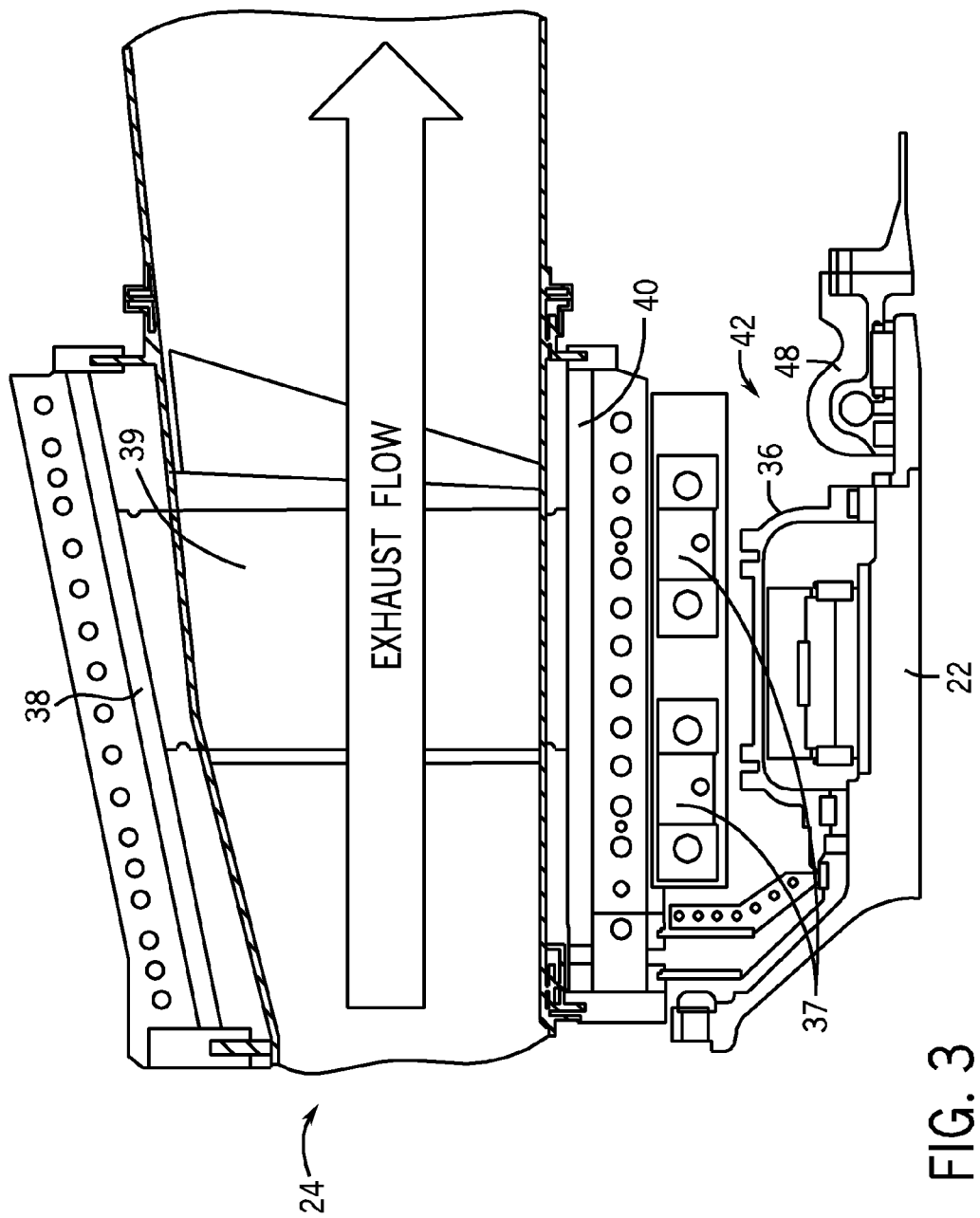
FIG. 3 is a cross-sectional view of an embodiment of the exhaust section of FIG. 1 sectioned through the longitudinal axis.

The exhaust section 24 may be assembled as an exhaust stator extending from the turbine section 22. As shown in cross-sectional view in FIG. 3, the exhaust section 24 may include outer exhaust frame 38 with support struts 39 that pass through the flow path of the exhaust section 24. In addition, the exhaust section 24 may include an inner housing barrel 40 surrounding a cavity 42. A rotor bearing housing 36 surrounding the rotor shaft 26 may be coupled to the inner housing barrel by supports 37. The bearing housing 36 may encompass various passageways to return lubricating fluids to the rotor bearing within the housing. The bearing housing 36 may be coupled by the mounting structures provided herein to a cooling gland 48 that provides cooling air to the rotor bearing within housing 36.

Figure 4:
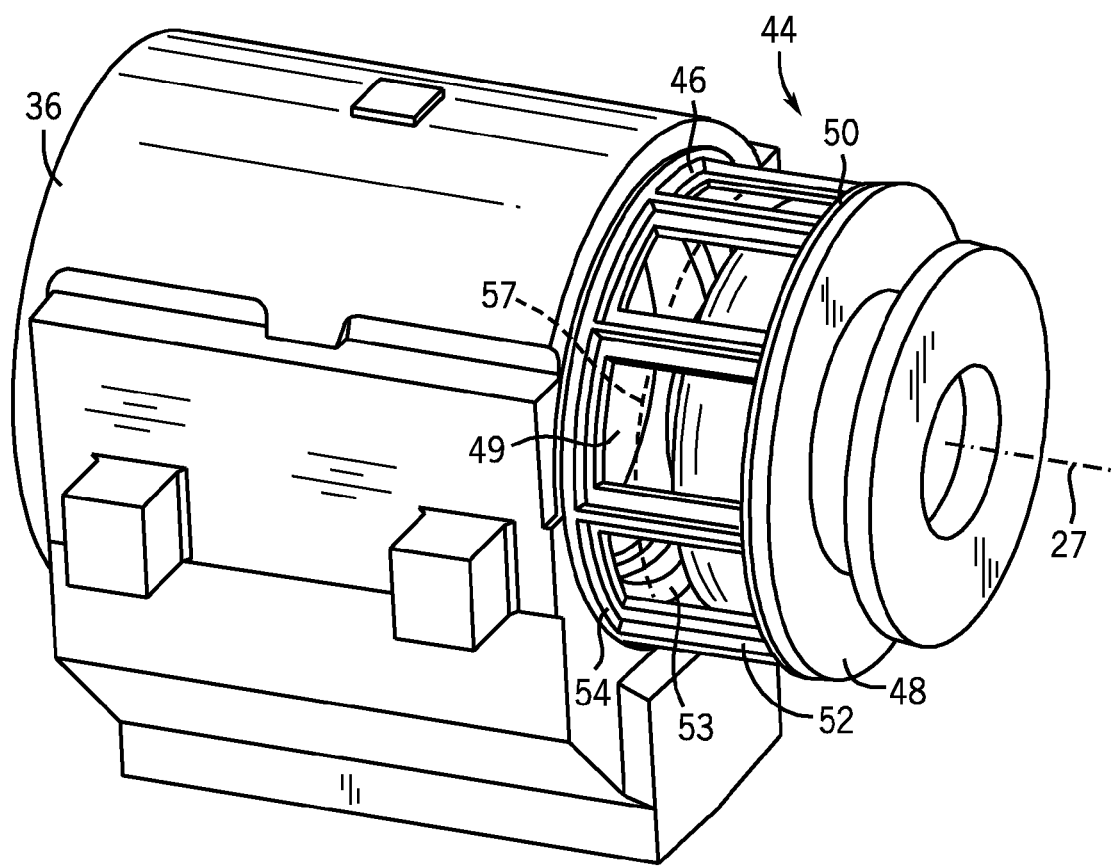
FIG. 4 is perspective view of an embodiment of a cooling gland mounted to a bearing housing.

FIG. 4 is a perspective view of an embodiment of a bearing housing 36 with a gland mounting assembly 44 affixed to the aft end. The gland mounting assembly 44 includes a mounting structure 46, shown here as a mounting cage, and a cooling gland 48. The cooling gland 48 is supported by annulus 50 of the mounting structure 46 and is held substantially in-line with passage 49 of bearing housing 36. The rotor 22 (not shown) may extend from the bearing housing 22 to rotate within cooling gland 48. The passage 49 may be substantially in-line with the axis of the rotating shaft 26. The mounting structure 46 includes ribs 52 that offset annulus 50 and cooling gland 48 from direct contact with the bearing housing 36. The ribs 52 may be any suitable size and material composition in order to substantially thermally isolate cooling gland 48 from the bearing housing 36. The mounting structure 46 may also include an attachment portion 54, shown in FIG. 4 as an annulus that may be aligned concentrically with passage 49. Accordingly, attachment portion 54 may be suitably sized and shaped so that the placement of the attachment portion 54 on the exterior of the bearing housing 36 allows for concentric alignment of the cooling gland 48 and the passage 49.

In certain embodiments, the cooling gland 48 and mounting structure 46 may be separable components or may be a single unitary component. Generally, the mounting structure 46 may be constructed from materials, such as cast metals, capable of supporting the load of the cooling gland 48. The mounting structure 46 may include predrilled holes suitable for fasteners, e.g., bolts, that may affix the mounting structure 46 to the exterior of the bearing housing 36. Similarly, the bearing housing 36 may include corresponding predrilled holes, e.g., threaded bolt receptacles. The presence of pre-drilled holes may assist in the proper alignment of the mounting assembly 44. The mounting structure 46 may also have alignment features such as rabbets or guides that cause the structure to assemble concentrically with the gland and/or the bearing housing.

The mounting structure 46 holds the cooling gland 48 in thermal isolation, e.g., axially spaces apart from the bearing housing along axis 27. Such an arrangement may provide the benefit of reducing heat transfer from the relatively cold bearing housing 36 to the relatively hot cooling gland 48. In other words, the cooling gland air is at a relatively higher temperature than certain parts of the bearing, such as the lubricating oil, which may burn off or become coked if exposed to higher temperatures. For example, the cooling gland may use steam of 1000° F. as the rotor coolant, which is much hotter than the bearing housing oil, which may typically be at 160° F. or less. In addition, the cooling gland 48 may also be held in such a manner as not to directly contact the housing of the exhaust section 24. Mounting structure 46 may reduce heat transfer from the cooling gland 48 to the bearing housing 36 by at least about 10%, by at least about 20%, by at least about 30%, by at least about 40%, by at least about 50%, by at least about 60%, by at least about 70%, by at least about 80%, or by at least about 90%, as compared to assemblies in which the cooling gland 48 may be in direct contact with the bearing housing 36. Further, the mounting structure 46 may be designed to minimize heat transfer. To this end, the mounting structure 46 may include ribs 52 that are relatively thin to minimize heat transfer from the ribs 52 to the bearing housing 36. The cutout spaces 53 between the ribs 52 may be relatively large, as larger cutout spaces 53 may further reduce the amount of heat transferred to the bearing housing 36. In embodiments, the ratio of the surface area of cutout spaces 53 to the surface area of the ribs 52 along a circumference 57 of the mounting structure 46 may be at least about 2:1, at least about 3:1, or at least about 4:1. In certain embodiments, the ribs 52 may also include cutout areas within the ribs themselves.

The ribs 52 may also act as a heat sink to dissipate heat from the cooling gland 48. In embodiments, the ribs 52 may include fins or other structures extending orthogonally from the ribs to facilitate the transfer of thermal energy from the cooling gland 48.

Figure 5:
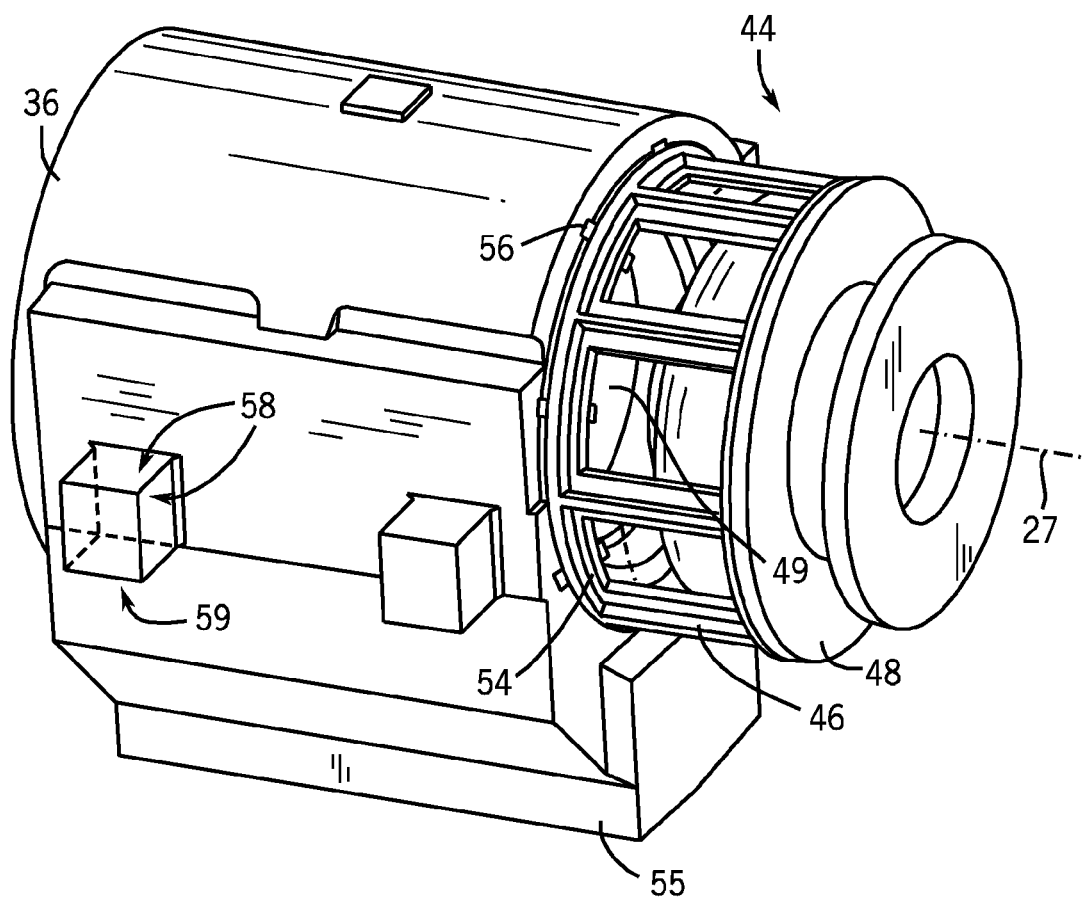
FIG. 5 is perspective view of a cooling gland mounted to a bearing housing with shims applied to a mounting structure to facilitate alignment.

FIG. 5 is a perspective view of embodiment of a mounting assembly 44 in which shims 56 have been applied between the mounting structure 46 and the bearing housing 36 in order to align the cooling gland 48 with passage 49. The use of shims 56 to optimize fine alignment of the cooling gland 48 may simplify an alignment process. For example, the cooling gland 48 and mounting structure 46 may be applied to the bearing housing generally in alignment with passage 49. This may be accomplished by substantially aligning the annular attachment portion 54 concentrically or coaxially with passage 49 along shaft rotational axis 27. After a rough alignment, any misalignment may be corrected by inserting shims 56 into the space between the mounting structure 46 and the bearing housing 36 to ensure axial alignment along the axis of passage 49. In embodiments, rather than using removable shims 56, attachment portion 54 may include guides, e.g., slots or tabs, or other structures that may mate with corresponding structures on bearing housing 36. After mating, the alignment may be optimized by tightening, loosing, or otherwise adjusting the guides. Shims applied between the mounting structure 46 and the bearing housing 36 may change the axial distance between the bearing housing and cooling gland. In addition, the bearing housing may be alignment by shimming ears 58 or gib 55 protruding from the bearing housing 36 to align the bearing housing to the stator support 59 such that the bearing is concentric to the rotor. Ears 58, which may protrude from the bearing housing 36, may be shimmed on any of four sides for vertical or axial alignment of the bearing housing. Having the gland rigidly and concentrically affixed to the bearing housing may allow a simple axial adjustment with the shims 56.

Figure 6:
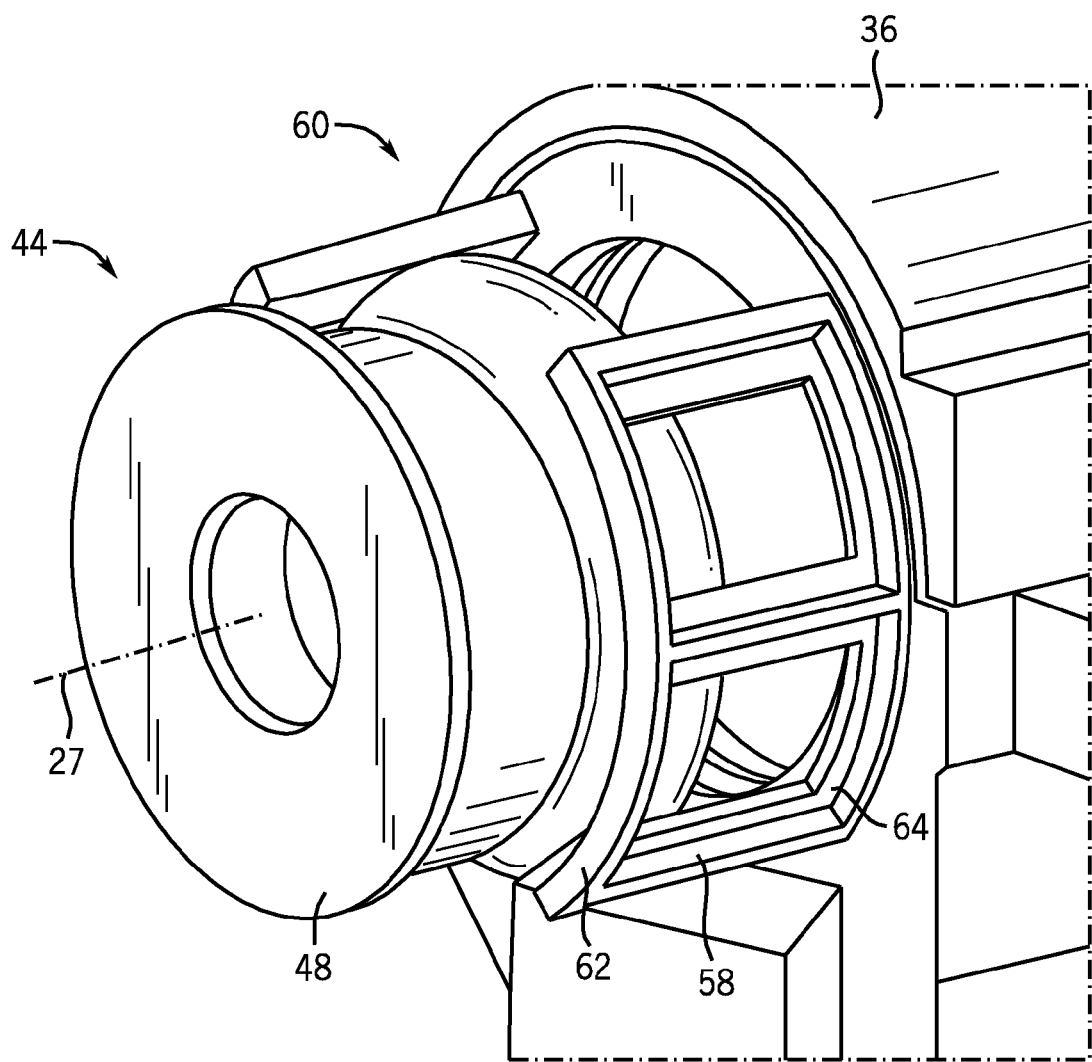
FIG. 6 is perspective view of an alternative direct cooling gland mounting to a bearing housing.

FIG. 6 is a perspective view of an alternative embodiment of a mounting assembly 44 in which a partial cage 60 is used to hold cooling gland 48 in thermal isolation from bearing housing 36. The partial cage 60 may include an attachment portion 54, shown here as two semi-annular structures 64, for securing the partial cage to the bearing housing 36. Ribs 58 may be spaced circumferentially about the semi-annular structures to support ears 62. Ears 62 may generally hold cooling gland 48 in thermal isolation from the bearing housing 36 along the rotational axis 27. The partial cage 60 may reduce the heat transfer to the cooling gland 48 because the ears 62 do not completely enclose the cooling gland 48.

Figure 7:
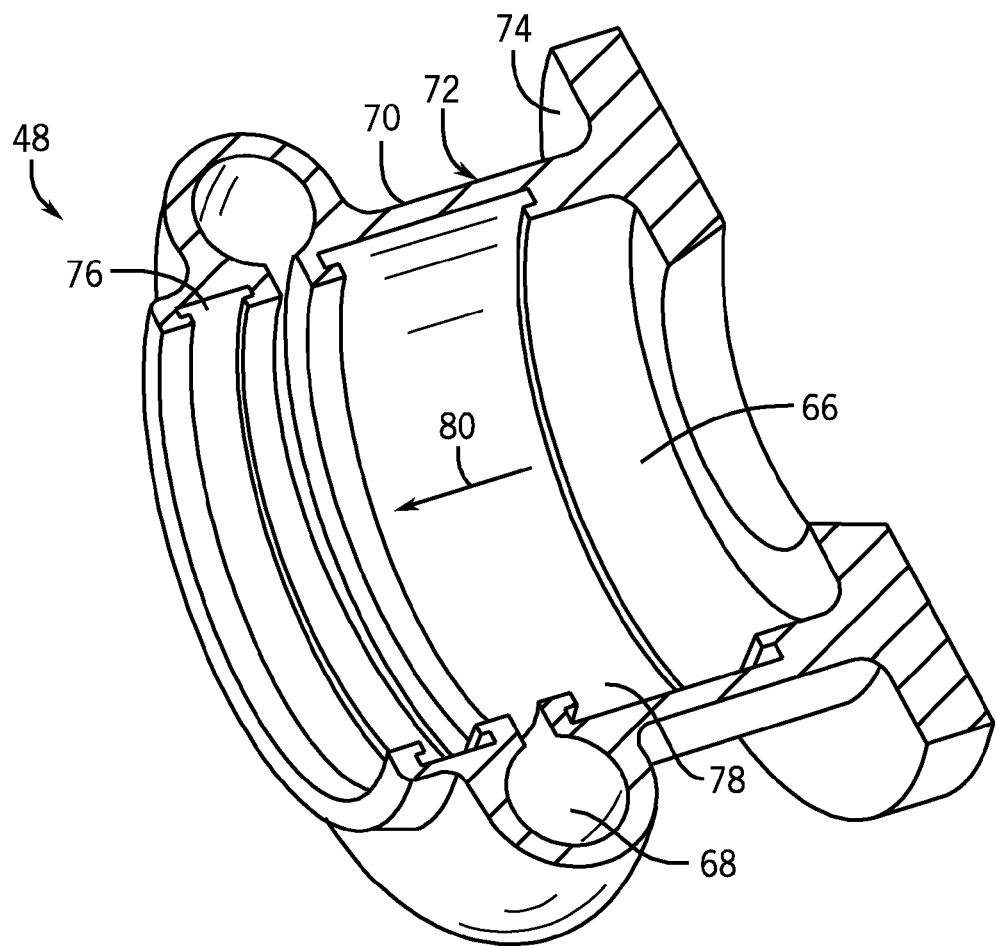
FIG. 7 is a cross-sectional view of a cooling gland.

FIG. 7 is a cross-sectional view of an exemplary cooling gland 48. The cooling gland 48 may define an interior passage 66 through which cooling fluids may pass. The cooling gland 48 may also include any suitable number of scrolls 68 to facilitate the transfer of cooling fluids to the rotor section 22. The scrolls may be in fluid communication with any number of cooling fluid inlet pipes (not shown) for providing cooling fluids to the rotor. The cooling gland 48 may include an annular indentation or channel 70 on the exterior surface 72 sized and shaped to accommodate the mounting structure, e.g., mounting structure 46. Pipe flange 74 provides an attachment point for a source, e.g., a pipe, containing rotor cooling fluid attaches to the gland 48 so that the cooling fluid may enter the rotor via path 80. The cooling gland may include seals 76 and 78 for sealing the gland to the shaft 22. Excess or leaked fluids may be trapped in cavity 68. In addition, the cooling gland 48 may include one or more to provide addition cooling circuits to the rotor are possible.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbine engine, comprising:
   a bearing housing having a passage along an axis of rotation of a shaft;
   a cooling gland configured to transfer cooling fluid to the passage; and
   a mounting structure configured to mount the cooling gland substantially in-line with the passage, wherein the cooling gland is spaced apart from the bearing housing.

2. The turbine engine of claim 1, wherein the mounting structure directly couples the cooling gland to the bearing housing.

3. The turbine engine of claim 1, comprising one or more shims or guides between the bearing housing and the mounting structure configured to align the cooling gland with the passage.

4. The turbine engine of claim 1, comprising one or more rabbets configured to align the bearing housing.

5. The turbine engine of claim 1, wherein the mounting structure and the cooling gland are separable from one another.

6. The turbine engine of claim 1, wherein the mounting structure and the cooling gland are integral with one another.

7. The turbine engine of claim 1, comprising a compressor, a combustor, a turbine, or a combination thereof, coupled to the bearing housing and/or the cooling gland.

8. A system, comprising:
   a bearing housing for a rotor having a passage along an axis of rotation of a shaft; and
   a cooling gland configured to transfer cooling fluid to the passage, wherein the cooling gland is coupled to the bearing housing, and wherein the cooling gland is mechanically spaced apart from the bearing housing along the axis of rotation.

9. The system of claim 8, wherein the cooling gland is coupled to the bearing housing substantially in-line with the passage.

10. The system of claim 8, wherein the cooling gland is mechanically spaced apart from the bearing housing by one or more rib structures.

11. The system of claim 8, wherein the cooling gland is configured to interface with one or more coolant pipes for providing the cooling fluid to the cooling gland.

12. A system, comprising:
   a cooling gland configured to transfer cooling fluid to a passage of a rotor;
   a mounting structure comprising:
      an attachment portion configured to mount to a rotor bearing housing;
      a support portion configured to hold the cooling gland; and
      an offset portion coupled to the attachment portion and the support portion configured to space the cooling gland axially apart from the rotor bearing housing.

13. The system of claim 12, wherein the support portion comprises an annulus.

14. The system of claim 12, wherein the support portion comprises one or more support ears.

15. The system of claim 12, wherein the offset portion comprises one or more ribs.

16. The system of claim 15, wherein the ribs are spaced about a circumference of the attachment portion to define one or more cutout portions such that a ratio of a surface area of the cutout portions relative to a surface area of the ribs is greater than about 2:1.

17. The system of claim 12, wherein the attachment portion comprises an annulus.

18. The system of claim 12, wherein the attachment portion comprises predrilled fastener holes that are configured to mate with corresponding holes on the rotor bearing housing.

19. The system of claim 18, wherein the predrilled fastener holes are configured to align the mounting structure and the rotor bearing housing so that the cooling gland is coaxial with the passage.

* * * * *